(12) United States Patent
Park

(10) Patent No.: US 8,493,929 B2
(45) Date of Patent: Jul. 23, 2013

(54) HANDOVER METHOD AND APPARATUS EMPLOYED BY MOBILE NODE TO REDUCE LATENCY IN INTERNET PROTOCOL CONFIGURATION

(75) Inventor: Soo-hong Park, Gwanju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1029 days.

(21) Appl. No.: 12/104,688

(22) Filed: Apr. 17, 2008

(65) Prior Publication Data

US 2008/0285519 A1 Nov. 20, 2008

Related U.S. Application Data

(60) Provisional application No. 60/938,261, filed on May 16, 2007.

(30) Foreign Application Priority Data

Jul. 10, 2007 (KR) .................... 10-2007-0069215

(51) Int. Cl.
*H04W 4/00* (2009.01)
(52) U.S. Cl.
USPC .......................................... 370/331
(58) Field of Classification Search
USPC .......... 370/203, 254, 289, 331–334, 328–329
See application file for complete search history.

(56) References Cited

U.S. PATENT DOCUMENTS

| | | | |
|---|---|---|---|
| 2006/0056311 A1 | 3/2006 | Han et al. | |
| 2006/0140150 A1 | 6/2006 | Olvera-Hernandez et al. | |
| 2006/0268782 A1* | 11/2006 | Kwak et al. | 370/331 |
| 2006/0277298 A1* | 12/2006 | Kim et al. | 709/224 |
| 2007/0058582 A1 | 3/2007 | Park et al. | |
| 2007/0091846 A1 | 4/2007 | Kim et al. | |
| 2008/0095114 A1* | 4/2008 | Dutta et al. | 370/331 |
| 2008/0287129 A1* | 11/2008 | Somasundaram et al. | 455/436 |
| 2008/0304454 A1* | 12/2008 | Zhong et al. | 370/331 |

(Continued)

FOREIGN PATENT DOCUMENTS

| | | |
|---|---|---|
| JP | 2007-82227 | 3/2007 |
| KR | 2006-119128 | 11/2006 |

OTHER PUBLICATIONS

International Search Report dated Jun. 18, 2008 of the PCT International Application No. PCT/KR2008/001223.

(Continued)

*Primary Examiner* — Jung-Jen Liu
(74) *Attorney, Agent, or Firm* — Staas & Halsey LLP

(57) ABSTRACT

A method and apparatus perform a handover of a mobile node with a decreased latency that occurs when the mobile node performs an Internet protocol (IP) configuration. The method of performing a handover of a mobile node includes: when the mobile node is connected to a network before the handover is performed, receiving first information on an IP configuration method to be used in a new network after the handover is performed from an information server (IS); when the mobile node is connected to the new network, receiving second information on the IP configuration method of the new network from a point of attachment (PoA) of the new network; determining whether the first information and the second information are identical; and, if it is determined that the first and second information are identical, performing an IP configuration according to the first information.

18 Claims, 7 Drawing Sheets

U.S. PATENT DOCUMENTS

| | | | |
|---|---|---|---|
| 2009/0047959 A1* | 2/2009 | Oba et al. | 455/436 |
| 2009/0201838 A1* | 8/2009 | Zhang et al. | 370/280 |
| 2010/0061336 A1* | 3/2010 | Kim et al. | 370/331 |
| 2010/0246532 A1* | 9/2010 | Olvera-Hernandez et al. | 370/331 |

OTHER PUBLICATIONS

Japanese Office Action issued Sep. 4, 2012 in corresponding Japanese Patent Application No. 2010-508285.

* cited by examiner

| Syntax | Length | Notes |
|---|---|---|
| IP Configuration Methods Bitmap | 4 Octets | Bit 0 : IPv4 static configuration<br>Bit 1 : IPv4 dynamic configuration (DHCPv4)<br>Bit 2 : Mobile IPv4 with foreign agent (FA) Care of Address (CoA) (FA-CoA)<br>Bit 3 : Mobile IPv4 without FA (Co-lacated CoA)<br>Bit 4 – 10 : reserved for IPv4 address configurations<br>Bit 11 : IPv6 stateless address configuration<br>Bit 12 : IPv6 stateful address configuration (DHCPv6)<br>Bit 13 : IPv6 manual configuration<br>Bit 14 – 31 : Reserved |

# HANDOVER METHOD AND APPARATUS EMPLOYED BY MOBILE NODE TO REDUCE LATENCY IN INTERNET PROTOCOL CONFIGURATION

CROSS-REFERENCE TO RELATED APPLICATIONS

This application claims the benefit of U.S. Patent Application No. 60/938,261, filed May 16, 2007 in the United States Patent and Trademark Office and Korean Application No. 2007-69215, filed Jul. 10, 2007 in the Korean Intellectual Property Office, the disclosures of which are incorporated herein by reference.

BACKGROUND OF THE INVENTION

1. Field of the Invention

Aspects of the present invention relate to a communication system, and more particularly, to a handover method and apparatus employed by a mobile node so as to reduce latency occurred when the mobile node performs an Internet protocol (IP) configuration in a mobile environment.

2. Description of the Related Art

Various types of wireless technologies have rapidly become popular. Handover information is used to perform a handover between networks in which different wireless technologies are used. The IEEE 802.21 media independent handover (MIH) working group has standardized a technology of previously receiving handover information pertaining to networks and performing a handover.

If a mobile node moves to a new network, it is necessary to newly set an Internet protocol (IP) address. However, each environment needs a different IP configuration method, which causes latency in an IP configuration when a handover is performed. In order to avoid such latency, information on an IP configuration method used in a new network needs to be obtained before a mobile node moves to the new network. However, when information on the IP configuration method used in a new network is obtained before a mobile node moves to the new network, the information is unlikely to accurately reflect the IP configuration method used in the new network. For example, a new network uses both A and B IP configuration methods before a mobile node moves to the new network, whereas the new network uses only the B method due to problems with the A method when the mobile node is moving to the new network. In such case, the mobile node is ready to perform IP configuration using the A method based on information on the A and B methods obtained before moving to the new network. However, since the A method cannot be used in the new network, the mobile node is required to perform IP configuration using the B method. Thus, the information obtained by the mobile node before moving to the new network is useless.

Accordingly, information on an IP configuration method used in a new network before a mobile node performs IP configuration for the new network after moving to the new network needs to be obtained, and whether the information is accurate needs to be determined.

SUMMARY OF THE INVENTION

Aspects of the present invention provide a handover method and apparatus employed by a mobile node so as to minimize latency that occurs in an Internet protocol (IP) configuration of a new network when the mobile node moves to the new network and performs the handover.

Aspects of the present invention also provide a computer-readable medium having embodied thereon a computer program for executing the method of performing a handover of a mobile node.

Aspects of the present invention also provide an information storage medium having recorded thereon a data format of a message used to transmit information on an IP configuration method of a new network after a handover is performed when the mobile node is connected to a network before performing the handover from an information server (IS) to a mobile node.

According to an aspect of the present invention, there is provided a method of performing a handover of a mobile node, including when the mobile node is connected to a network before the handover is performed, receiving first information on an Internet protocol (IP) configuration method to be used in a new network after the handover is performed from an information server (IS); when the mobile node is connected to the new network, receiving second information on the IP configuration method of the new network from a point of attachment (PoA) of the new network; determining whether the first information received from the IS and the second information received from the PoA of the new network are identical; and if it is determined that the first and second information are identical, performing an IP configuration according to the first information.

According to aspects of the invention, the method may further comprise: if it is determined that the first and second information are not identical, performing the IP configuration according to the second information.

According to aspects of the invention, the receiving of the first information may comprise: receiving data in the form of a bitmap in which bits corresponding to the IP configuration method of the new network have a value of 1, and the other bits have a value of 0.

According to aspects of the invention, the receiving of the second information may comprise: a link layer of the mobile node to receive the second information from the PoA of the new network; and the link layer of the mobile node transmitting Link_Up.indication data including the second information to a handover function layer of the mobile node.

According to aspects of the invention, the performing of the IP configuration according to the first information may comprise: the handover function layer of the mobile node transmitting MIH_Link_Up.indication data notifying an IP layer of the mobile node to perform the IP configuration according to the first information; and the IP layer of the mobile node extracting information on the IP configuration method from the MIH_Link_Up.indication data and performing the IP configuration according to the first information.

According to another aspect of the present invention, there is provided an apparatus for performing a handover of a mobile node, including a first information receiving unit, when the mobile node is connected to a network before the handover is performed, to receive first information on an IP configuration method to be used in a new network after the handover is performed from an IS; a second information receiving unit, when the mobile node is connected to the new network, to receive second information on the IP configuration method of the new network from a PoA of the new network; an information comparison unit to compare the first information received from the IS and the second information received from the PoA of the new network in order to determine whether the first and second information are identical; and an IP configuration unit, if it is determined that both the first and second information are identical, to perform IP configuration according to the first information.

According to aspects of the invention, if it is determined that the first and second information are not identical, the IP configuration unit may perform the IP configuration according to the second information.

According to aspects of the invention, the first information receiving unit may receive data in the form of a bitmap in which bits corresponding to the IP configuration method of the new network have a value of 1, and the other bits have a value of 0.

According to another aspect of the present invention, there is provided an information storage medium having recorded thereon a data format of a message used to transmit information on an IP configuration method to be used in a new network after a handover is performed when a mobile node is connected to a network before the handover is performed from an IS to a mobile node, the information storage medium including a first field to indicate a type of the message; a second field to indicate a length of the message; and a third field to indicate information on an IP configuration method to be used in the new network.

According to aspects of the invention, the field indicating information on the IP configuration method to be used in the new network may be a bitmap in which bits corresponding to the IP configuration method of the new network have a value of 1, and the other bits have a value of 0.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates a format of the first information on an IP configuration method of a new network in the form of a bitmap according to an embodiment of the present invention;

DETAILED DESCRIPTION OF THE EMBODIMENTS

Figure 1:
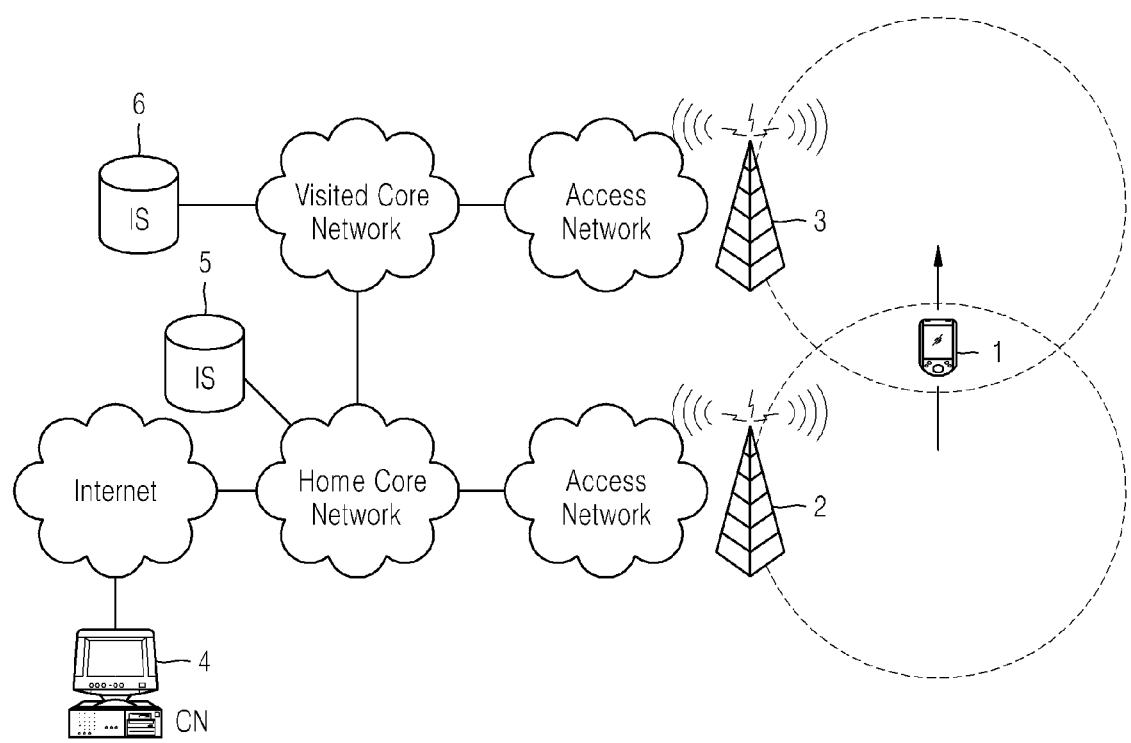
FIG. 1 is a diagram of a mobile communication environment in which a mobile node (MN) performs a handover according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a method and apparatus for performing a handover of a mobile node according to embodiments of the present invention will be described in detail with reference to the accompanying drawings.

FIG. 1 is a diagram of a mobile communication environment in which a mobile node (MN) 1 performs a handover according to an embodiment of the present invention. Referring to FIG. 1, the mobile communication environment includes the MN 1, a plurality of points of attachment (PoAs) 2 and 3, a corresponding node (CN) 4, information servers (ISs) 5 and 6, and a plurality of networks including the internet, visited core networks, and access networks. However, the network topology illustrated in FIG. 1 is not limited thereto and can be variously constructed. Moreover, while not limited thereto, the MN1 can be a portable computer, a portable media player, or any device which wirelessly communicates while moving relative to PoAs.

The MN 1 is a mobile terminal that uses the mobile communication environment. When the MN 1 starts mobile communication, the MN 1 registers a home address (HoA) with a home agent (not shown) on a home network. When the MN 1 moves to a new network, the MN 1 obtains a care of address (CoA) from a foreign agent (FA) in the new network. The MN 1 delivers the obtained CoA to the home agent so as to register the CoA with the home agent. Then, the home agent matches the CoA and the HoA, which is referred to as address binding.

The MN 1 moves to another network, obtains a CoA of the network, and delivers the CoA to the home agent. At this time, the home agent cancels the previous binding, and binds the HoA and the CoA, which is referred to as a binding update (BU).

The CN 4 needs to be informed of an address of the MN 1 in order to transmit data to the MN 1. Since the CN 4 is already informed of the HoA of the MN 1, the CN 4 sets the HoA of the MN 1 as a target address and transmits a data packet to the target address. The home agent receives the data packet in which the HoA is set as the target address. Since the home agent is already informed of the CoA corresponding to the HoA, the home agent sets the CoA as a target address, and transmits the data packet to the target address. The data packet is delivered to the MN 1 via the network.

A PoA connects the MN 1 to the network, and is an access point (AP), a base station (BS), or so on. However, the PoA is not limited thereto and can transmit data between the MN 1 and the network.

While the MN 1 moves to another network, the handover is performed. In the present embodiment of the present invention, the MN 1 moves from a network area where data communication is performed via the current PoA 2 to a network area where data communication is performed via the PoA 3. The MN 1 receives information on the new network and the PoA 3 of the new network via the current PoA 2. The MN 1 receives the information on the new network and the PoA 3 of the new network from the IS 5 or 6. Alternatively, if the current PoA 2 serves as an IS, the MN 1 can directly receive the information from the current PoA 2. The MN 1 can be informed of a network protocol and service that are respectively used and supported in the new network, using the information received from the IS 5 or 6 via the PoA 2 or from the PoA 2 directly.

Figure 2:
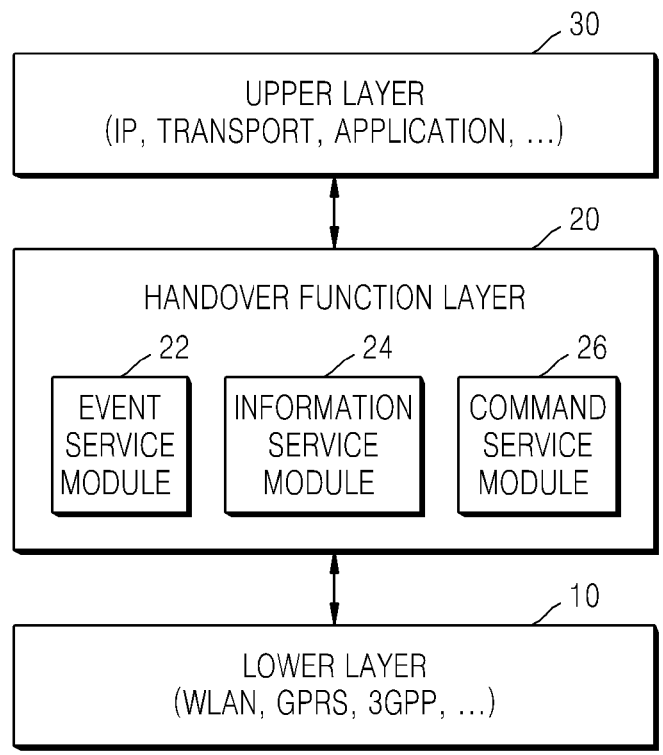
FIG. 2 is a block diagram of network layers of an MN that performs a handover according to an embodiment of the present invention.

FIG. 2 is a block diagram of network layers of a mobile node for performing a handover according to an embodiment of the present invention. Referring to FIG. 2, the network layers include a lower layer 10, a handover function layer 20, and an upper layer 30. The lower layer 10 includes a second layer and layers (i.e., a link layer and a physical layer) which are lower than the second layer of the seven layers defined by the open systems interconnection (OSI) reference model. The lower layer 10 can support various network standards as shown in FIG. 2. For example, the lower layer 10 can support one or more of a wireless local area network (WLAN), a general packet radio service (GPRS), and a 3rd generation partnership project (3GPP).

The upper layer 30 includes a third layer and layers (i.e., an Internet protocol (IP) layer, a mobile IP layer, a transport layer, and an application layer) higher than the third layer of the seven layers defined by the OSI reference model. The application layer of the upper layer 30 may include a user application.

The handover function layer 20, which supports a handover in the lower layer 10 and the upper layer 30, is not defined by the OSI reference model, and is a layer between the lower layer 10 and the upper layer 30, referred to herein as the 2.5 layer. The handover function layer 20 supports a handover between heterogeneous links, independent of a media type of a link to which the MN 1 is connected. That is, the handover function layer 20 supports the handover between heterogeneous links, independent of the type of link interface supported by the lower layer 10.

In FIG. 2, the handover function layer 20 includes an event service module 22, an information service module 24, and a command service module 26. The event service module 22 detects an occurrence of an event related to a handover among various links performed by the MN 1, and reports the occurrence of the event to the upper layer 30. The information service module 24 obtains information on a handover between heterogeneous links performed by the MN 1 from the ISs 5 and 6 that collect and manage information on the obtained information on the handover between heterogeneous links or a PoA that simultaneously serves as the IS. The command service module 26 controls a handover at the lower layer 10 (that is, at a link layer) according to commands input from the upper layer 30 (e.g., commands input by a user).

Figure 3:
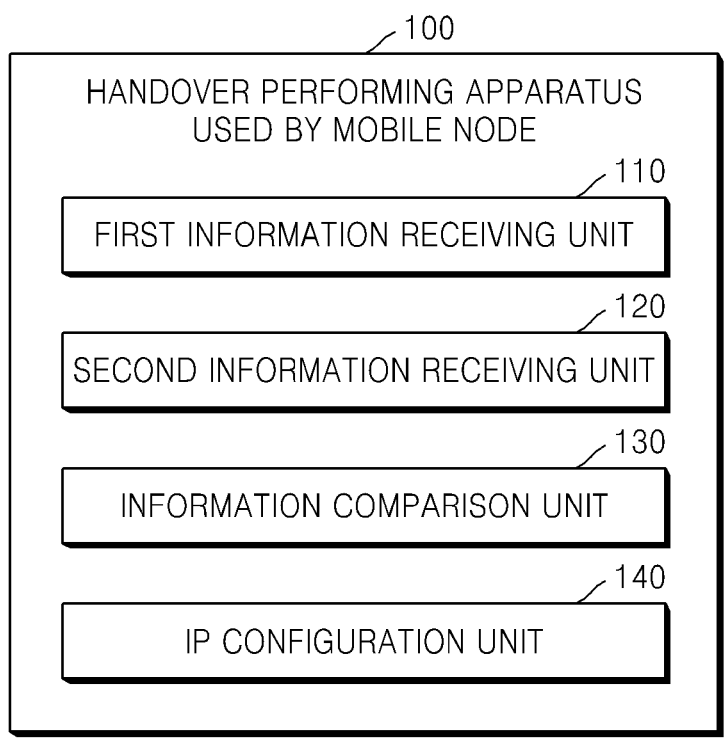
FIG. 3 is a block diagram of a handover apparatus used by an MN according to an embodiment of the present invention.
Figure 4:
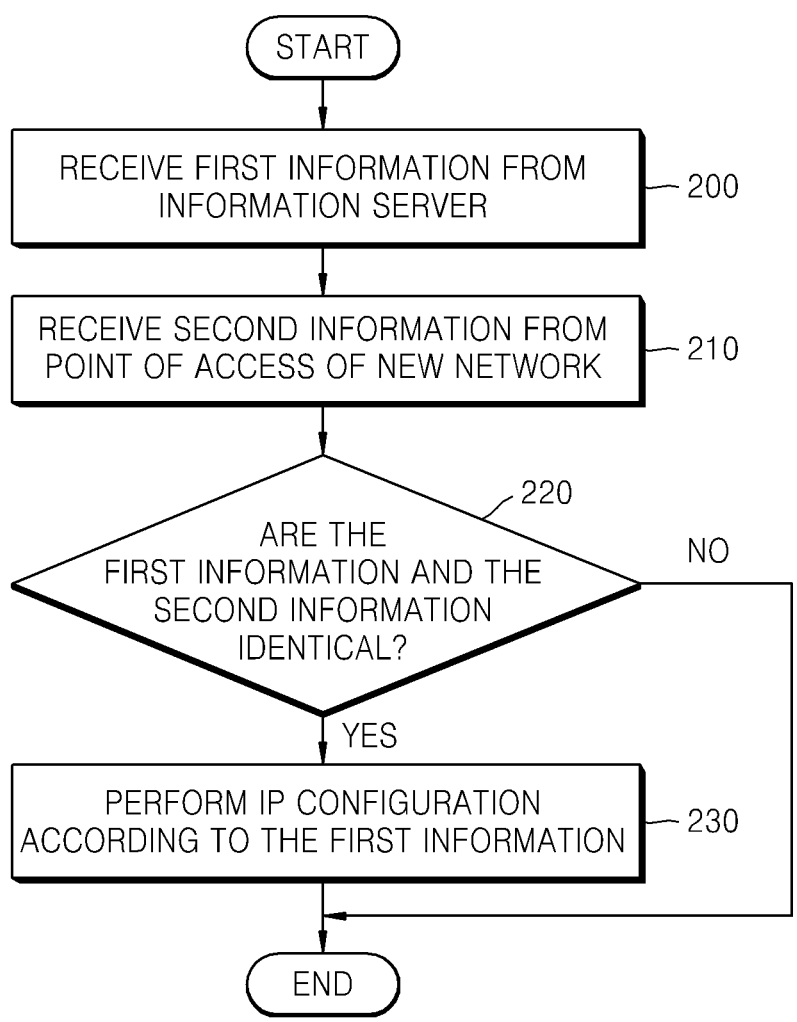
FIG. 4 is a flowchart illustrating a handover method used by an MN according to an embodiment of the present invention.

FIG. 3 is a block diagram of a handover apparatus 100 used by the MN 1 according to an embodiment of the present invention. FIG. 4 is a flowchart illustrating a handover method used by the MN 1 according to an embodiment of the present invention. Referring to FIG. 3, the handover apparatus 100 used by the MN 1 may comprise a first information receiving unit 110, a second information receiving unit 120, an information comparison unit 130, and an IP configuration unit 140. When the MN 1 is connected to a first network before a handover is performed, the first information unit 110 receives first information on an IP configuration method (Operation 200 in FIG. 4) to be used in a new network after the handover is performed from an IS.

When the MN 1 is connected to the new network, the second information receiving unit 120 receives second information on the IP configuration method of the new network from a PoA of the new network (Operation 210 in FIG. 4).

The information comparison unit 130 compares the first and second information to each other in order to determine whether both the first and second information are identical (Operation 220 in FIG. 4). If the information comparison unit 130 determines that both the first and second information are identical, the IP configuration unit 140 performs IP configuration according to the first information (Operation 230 in FIG. 4). If the information comparison unit 130 determines that the first and second information are not identical, the handover method as illustrated in FIG. 4 is terminated; however, aspects of the present invention are not limited thereto.

Figure 5:
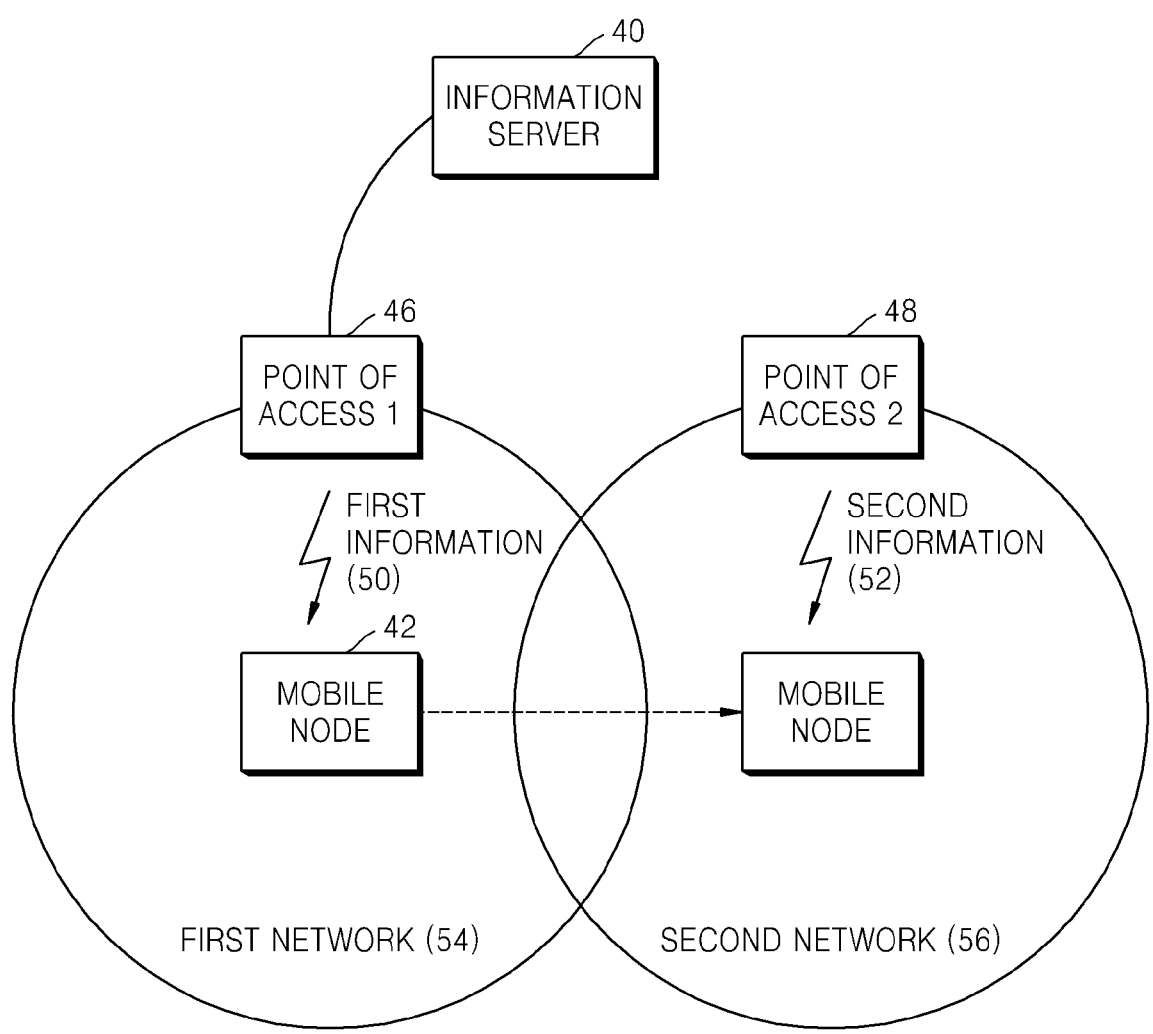
FIG. 5 illustrates an Internet protocol (IP) configuration process performed by MNs using a handover method according to an embodiment of the present invention.

FIG. 5 illustrates an IP configuration process performed by MNs using a handover method according to an embodiment of the present invention. Referring to FIG. 3 and FIG. 5, before a handover is performed, an MN 42 is connected to a first network 54 via a first PoA 46. The first information receiving unit 110 of the MN 42 receives first information 50 on an IP configuration method of a second network 56 from an IS 40. The MN 42 prepares the IP configuration using the first information 50.

The first information 50 on the IP configuration method of the second network 56 may be provided from a second PoA 48 of the second network 56 to the IS 40, or may be obtained by the IS 40 using another method. However, after the IS 40 obtains the first information 50, the environment of the second network 56 may change and thus the IP configuration method can be changed. If handover information changes, although such a change may be immediately updated on the IS 40, the handover information owned by the IS 40 may not be updated. Furthermore, while the MN 42 moves from the first network 54 to the second network 56, the IP configuration method of the second network 56 can be changed. Therefore, it is necessary to determine whether the first information 50 is updated at the time when the MN 42 performs the handover in the second network 56.

If the MN 42 moves from the first network 54 to the second network 56, the MN 42 performs the handover to connect to the second network 56, which is a new network. The MN 42 is connected to the second PoA 48 of the second network 56 and exchanges necessary information with the second PoA 48. At this time, the second information receiving unit 120 of the MN 42 receives second information 52 on an IP configuration method that is used in the second network 56 from the second PoA 48.

While the MN 42 performs the handover by a message exchange with the second PoA 48, the information comparison unit 130 compares the first information 50 and the second information 52 to determine whether the first information 50 and the second information 52 are identical. If the information comparison unit 130 determines that the first information 50 and the second information 52 are identical, the IP configuration unit 140 performs IP configuration according to the first information 50. If the information comparison unit 130 determines that the first information 50 and the second information 52 are not identical, several methods may be used to perform IP configuration.

If the MN 42 can perform IP configuration according to the second information 52, the MN 42 may perform IP configuration according to the second information 52. Furthermore, it is possible to inform the IS 40 or other devices that use a handover function layer 20 of FIG. 2 (i.e., media independent handover (MIH) users) that the first information 50 is not accurate. If the MN 42 cannot perform IP configuration according to the second information 52, the MN 42 may attempt a handover to connect to another network (not shown) without further proceeding with the connection to the second network 56.

Figure 6:
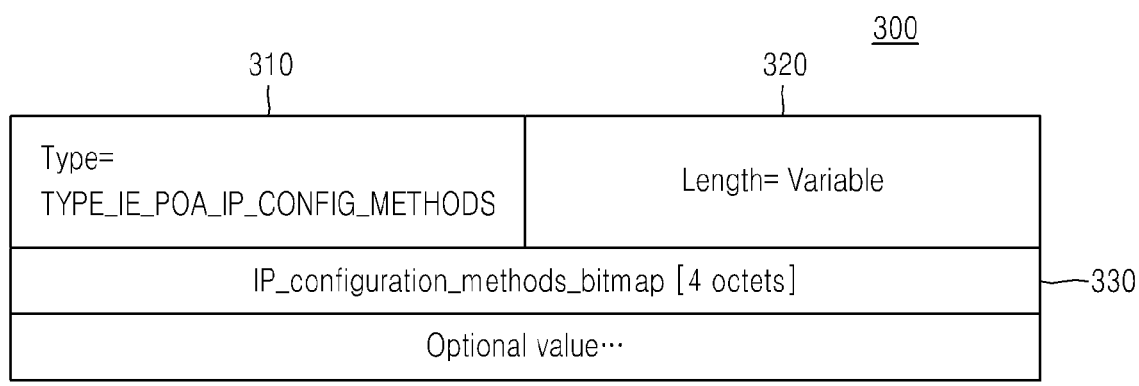
FIG. 6 illustrates a format of a message used to deliver first information by an information server (IS) according to an embodiment of the present invention.

FIG. 6 illustrates a format of a message used to deliver the first information 50 by the IS 40 according to an embodiment of the present invention. The IS 40 may deliver handover information in the form of an information element (IE) to the MN 42. Referring to FIG. 6, a PoA IP configuration method IE 300 may include a type field 310 to indicate the PoA IP configuration method IE 300, a first field 320 to indicate the length of the PoA IP configuration method IE 300, and a second field 330 to indicate the first information 50 on the PoA IP configuration method IE 300. The second field 330 that indicates the first information on the IP configuration method IE 300 of a new network may be in the form of a bitmap.

FIG. 7 illustrates a format of the first information 50 on the IP configuration method IE 300 of the new network in the form of the bitmap as indicated by the second field 330 of FIG. 6 according to an embodiment of the present invention. Referring to FIG. 7, the second field 330 that indicates the IP configuration method has 4 octets (i.e., a 32 bit length). Each of bits 0 through 31 corresponds to one IP configuration method. A bit corresponding to an IP configuration that is supported in the new network is 1, and other bits are 0. For example, if bits 1 and 12 are 1 and other bits are 0, DHCPv4 and DHCPv6 methods are used in the new network.

Bits 4 through 10 are reserved for designation of other IPv4 configuration methods, and bits 14 through 31 are reserved for designation of other IPv6 configuration methods. However, the present embodiment of the present invention is not limited thereto as it is possible to designate bits to indicate IP configuration methods in different orders. The IP configuration methods may be presented in the form of a bitmap, which reduces the amount of data to be delivered and thus network traffic can be decreased.

Figure 8:
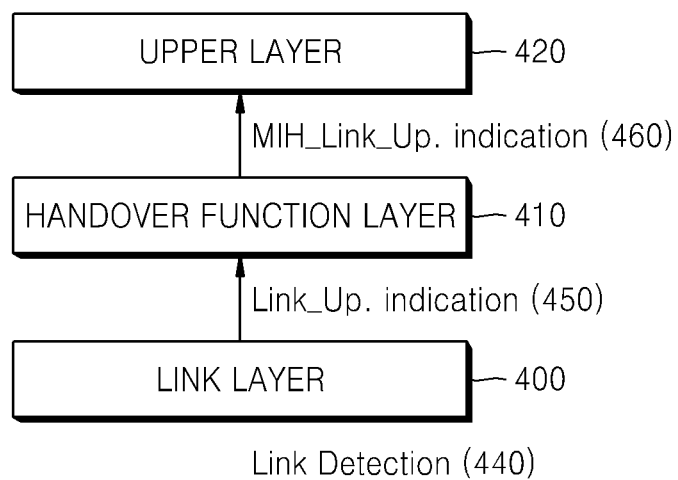
FIG. 8 illustrates the movement of second information received from a point of access (PoA) of a new network within an MN while the MN is connected to the new network, according to an embodiment of the present invention.

FIG. 8 illustrates the movement of the second information 52 of FIG. 5 received from a PoA of the second or new network 56 within an MN 42 while the MN 42 is connected to the new network 56 according to an embodiment of the present invention. Referring to FIG. 8, a link layer 400 detects a link (Operation 440) and obtains the second information 52 of FIG. 5 on an IP configuration method used in the new network 56. The second information 52 is received from the PoA 48 of the new network 52 during the link detection process. However, aspects of the present invention are not limited thereto as the second information 52 may be transferred to the MN 42 through other methods as described above. The link layer 400 delivers data Link_Up.indication 450 to a handover function layer 410.

Figure 9:
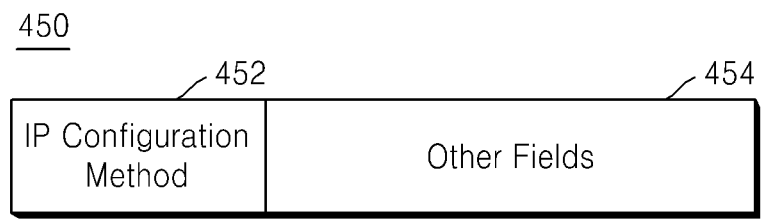
FIG. 9 illustrates a format of a data Link_Up.indication according to an embodiment of the present invention.

FIG. 9 illustrates a format of the data Link_Up.indication 450 according to an embodiment of the present invention. Referring to FIG. 9, the data Link_Up.indication 450 includes a first field 452 to indicate aspects of the second information 52 on the IP configuration method and other fields 454 indicating other types of information.

The handover function layer 410 extracts the second information 52 on the IP configuration method from the data Link_Up.indication 450, and compares the first information 50 and the second information 52 to determine whether the first information 50 and the second information 52 are identical.

If the handover function layer 410 determines that the first information 50 and the second information 52 are identical, the handover function layer 410 delivers data MIH_Link_Up.indication 460 to an upper or IP layer 420, which is a layer higher than the handover function layer 410, which performs IP configuration according to the first information 50. The IP layer 420 extracts information on the IP configuration method from the data MIH_Link_Up.indication 460 and performs the IP configuration.

Aspects of the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage.

The handover method and apparatus used by a mobile node according to the aspects of the present invention obtain first information on an IP configuration method used in a new network from an information server in order to prepare for IP configuration, receive second information on the IP configuration method used in the new network while the mobile node is connected to the new network, and compare the first information and the second information so as to perform IP configuration according to accurate information, thereby preventing unnecessary latency from occurring in the new network and thus the IP configuration is quickly and efficiently performed and a handover is quickly performed by the mobile node.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of performing a handover of a mobile node, comprising:
    receiving first information on an Internet protocol (IP) configuration method from an information server (IS) while the mobile node is connected to a first network before the handover is performed to connect to a second network, the first information to be used in the second network after the handover is performed;
    receiving second information on the IP configuration method of the second network from a point of attachment (PoA) of the second network when the mobile node is connected to the second network;
    determining whether the first information received from the IS and the second information received from the PoA of the second network are identical;
    performing an IP configuration according to the first information if it is determined that the first and second information are identical; and
    performing the method with respect to a third network if the mobile node is incapable of performing the IP configuration according to the second information when the first information and the second information are determined to be not identical.

2. The method of claim 1, further comprising:
    performing the IP configuration according to the second information if it is determined that the first and second information are not identical.

3. The method of claim 1, wherein the receiving of the first information comprises:
    receiving data in the form of a bitmap in which bits corresponding to the IP configuration method of the second network have a value of 1, and the other bits have a value of 0.

4. The method of claim 1, wherein the receiving of the second information comprises:
    a link layer of the mobile node receiving the second information from the PoA of the second network; and
    the link layer of the mobile node transmitting Link_Up.indication data including the second information to a handover function layer of the mobile node.

5. The method of claim 4, wherein the performing of the IP configuration according to the first information comprises:
    the handover function layer of the mobile node transmitting MIH_Link_Up.indication data to notify an IP layer of the mobile node to perform the IP configuration according to the first information; and the IP layer of the mobile node extracting information on the IP configuration method from the MIH_Link_Up.indication data and performing the IP configuration according to the first information.

6. The method of claim 1, further comprising:
performing the method with respect to a third network if the first information and the second information are determined to be not identical.

7. The method of claim 1, wherein the IS is a PoA of the first network.

8. An apparatus to perform a handover of a mobile node (MN), comprising:
a first information receiving unit to receive a first information on an Internet protocol (IP) configuration method from an information server (IS) while the mobile node is connected to a first network before the handover is performed to connect to a second network, the first information to be used in the second network after the handover is performed;
a second information receiving unit to receive a second information on the IP configuration method of the second network from a point of attachment (PoA) of the second network when the mobile node is connected to the second network;
an information comparison unit to determine whether the first information received from the IS and the second information received from the PoA of the second network are identical;
an IP configuration unit which performs IP configuration according to the first information if the information comparison unit determines that the first and second information are identical; and
the MN attempts to connect to a third network if the IP configuration unit cannot perform the IP configuration according to the second information if the information comparison unit determines that the first and second information are not identical.

9. The apparatus of claim 8, wherein the IP configuration unit performs the IP configuration to connect to the second network according to the second information if the information comparison unit determines that the first and second information are not identical.

10. The apparatus of claim 8, wherein the first information receiving unit receives data in the form of a bitmap in which bits corresponding to the IP configuration method of the second network have a value of 1, and the other bits have a value of 0.

11. The apparatus of claim 8, wherein the IS is a PoA of the first network.

12. The apparatus of claim 8, further comprising:
an upper layer including third and above layers of the open systems interconnection reference model to support at least an application;
a lower layer including second and below layers of the open systems interconnection reference model to support a plurality of network standards; and
a handover function layer between the upper layer and the lower layer to support the handover between heterogeneous links independent of the network standards supported by the lower layer.

13. The apparatus of claim 12, wherein the handover function layer comprises:
an event service module to detect an occurrence of an event related to the handover and to report the occurrence of the event to the upper layer; an information service module to obtain information on the handover from the IS and to manage the information on the handover; and
a command service module to control the handover at the lower layer.

14. The apparatus of claim 13, wherein the command service module controls the handover at the lower layer according to commands input from the upper layer.

15. The apparatus of claim 14, wherein the commands input from the upper layer are commands input by a user.

16. The apparatus of claim 12, wherein the application supported by the upper layer is a user application.

17. A non-transitory computer-readable medium having embodied thereon a computer program for executing the method of performing a handover of a mobile node to be implemented by a computer, the method comprising:
receiving first information on an Internet protocol (IP) configuration method from an information server (IS) while the mobile node is connected to a first network before the handover is performed to connect to a second network, the first information to be used in the second network after the handover is performed;
receiving second information on the IP configuration method of the second network from a point of attachment (PoA) of the second network when the mobile node is connected to the second network;
determining whether the first information received from the IS and the second information received from the PoA of the second network are identical; and
performing an IP configuration according to the first information if it is determined that the first and second information are identical; and
performing the method with respect to a third network if the mobile node is incapable of performing the IP configuration according to the second information when the first information and the second information are determined to be not identical.

18. An apparatus to perform a handover of a mobile node (MN), comprising:
an information receiving unit to receive a first information on an Internet protocol (IP) configuration method from an information server (IS) while the mobile node is connected to a first network before the handover is performed to connect to a second network, the first information to be used in the second network after the handover is performed, and to receive a second information on the IP configuration method of the second network from a point of attachment (PoA) of the second network when the mobile node is connected to the second network;
an information comparison unit to determine whether the first information received from the IS and the second information received from the PoA of the second network are identical;
an IP configuration unit which performs IP configuration according to the first information if the information comparison unit determines that the first and second information are identical; and
the MN attempts to connect to a third network if the IP configuration unit cannot perform the IP configuration according to the second information if the information comparison unit determines that the first and second information are not identical.

* * * * *

UNITED STATES PATENT AND TRADEMARK OFFICE
CERTIFICATE OF CORRECTION

PATENT NO. : 8,493,929 B2  
APPLICATION NO. : 12/104688  
DATED : July 23, 2013  
INVENTOR(S) : Soo-hong Park Page 1 of 1

It is certified that error appears in the above-identified patent and that said Letters Patent is hereby corrected as shown below:

Title page item [75] (Inventors), Line 1, Delete "Gwanju-si" and insert -- Gwangju-si --, therefor.

Signed and Sealed this  
Eighteenth Day of February, 2014

Michelle K. Lee  
*Deputy Director of the United States Patent and Trademark Office*